United States Patent [19]

Shanks

[11] Patent Number: 5,193,015
[45] Date of Patent: Mar. 9, 1993

[54] CHOLESTERIC LIQUID CRYSTAL SCREEN WHICH REFLECTS SUBSTANTIALLY ALL OF THE PROJECTED LIGHT

[75] Inventor: Ian A. Shanks, Buckinghamshire, England

[73] Assignee: Thorn EMI plc, London, England

[21] Appl. No.: 593,215

[22] Filed: Oct. 5, 1990

[30] Foreign Application Priority Data

Oct. 5, 1989 [GB] United Kingdom ............... 8922415

[51] Int. Cl.⁵ ................ G02F 1/133; G02F 1/1335; G03B 21/56; G03B 21/32
[52] U.S. Cl. ............................ 359/53; 359/70; 359/101; 359/443; 352/86; 353/84
[58] Field of Search ................ 350/322, 331 R, 334, 350/349, 335; 352/244, 61, 40, 41, 42, 86; 353/121, 122, 84; 359/70, 53, 73, 98, 101, 443, 449

[56] References Cited

U.S. PATENT DOCUMENTS

| | | | |
|---|---|---|---|
| 2,341,982 | 2/1944 | Dillehay et al. | 88/28.93 |
| 3,248,165 | 4/1966 | Marks et al. | 352/61 X |
| 3,279,313 | 10/1966 | Kowalik et al. | 352/61 X |
| 3,650,608 | 5/1972 | Baker | 352/40 X |
| 3,836,230 | 9/1974 | Adams et al. | 359/70 |
| 4,246,302 | 1/1981 | Benton et al. | 350/351 X |
| 4,639,090 | 1/1987 | Cleve et al. | 359/101 X |
| 4,664,479 | 5/1987 | Hiroshi | 350/338 |
| 4,726,660 | 2/1988 | Rushford | 350/347 E |
| 4,928,123 | 5/1990 | Takafuji et al. | 353/122 X |
| 4,943,154 | 7/1990 | Miyatake et al. | 359/41 X |
| 4,989,954 | 2/1991 | Yokoyama et al. | 350/337 |
| 5,075,789 | 12/1991 | Jones et al. | 359/70 X |

FOREIGN PATENT DOCUMENTS

| | | |
|---|---|---|
| 0188804 | 7/1986 | European Pat. Off. |
| 59-214837 | 12/1984 | Japan |
| 59-214838 | 12/1984 | Japan |
| 60-165632 | 8/1985 | Japan |
| 1-289940 | 11/1989 | Japan |
| 413572 | 7/1934 | United Kingdom |

OTHER PUBLICATIONS

Scheffer, "Twisted Nematic Display with Cholesteric Reflector", Journal of Physics D=Applied Physics, vol. 8, 1975, pp. 1441-1448.

*Primary Examiner*—William L. Sikes
*Assistant Examiner*—Ron Trice
*Attorney, Agent, or Firm*—Keck, Mahin & Cate

[57] ABSTRACT

A screen for use in a front projection system includes a section capable of reflecting light of certain, predetermined wavelengths more than light of other wavelengths. The screen appears black or dark gray when viewed in broadband light. The screen provides for enhanced contrast between incident projected and ambient light. A projector for use with the screen has a light source capable of emitting the predetermined wavelengths.

3 Claims, 2 Drawing Sheets

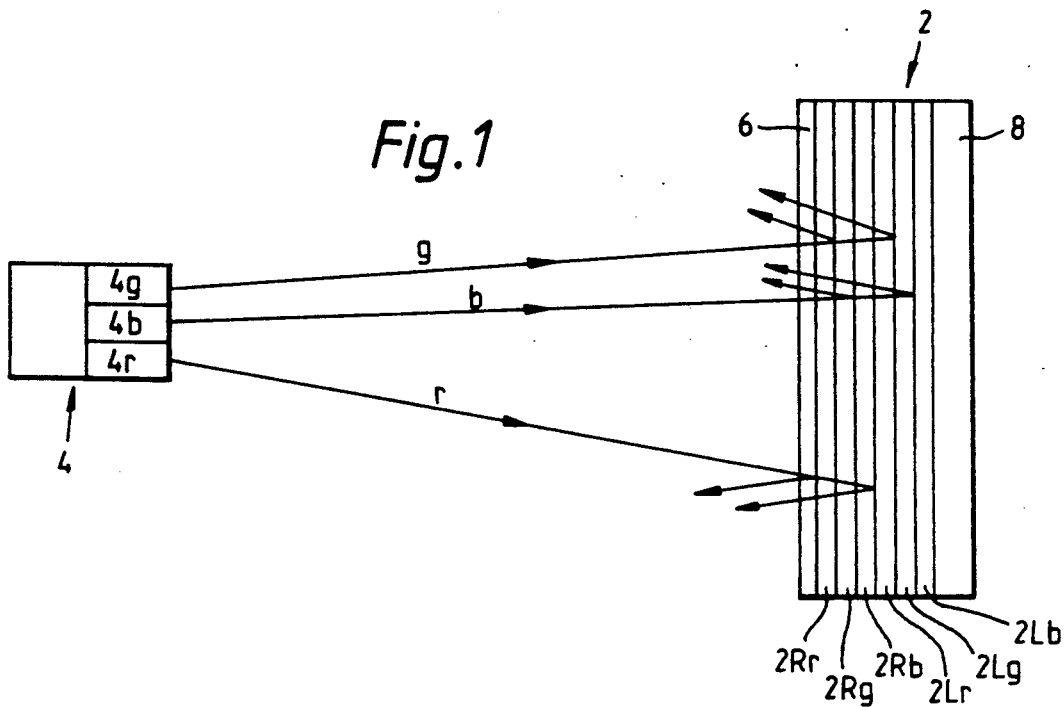
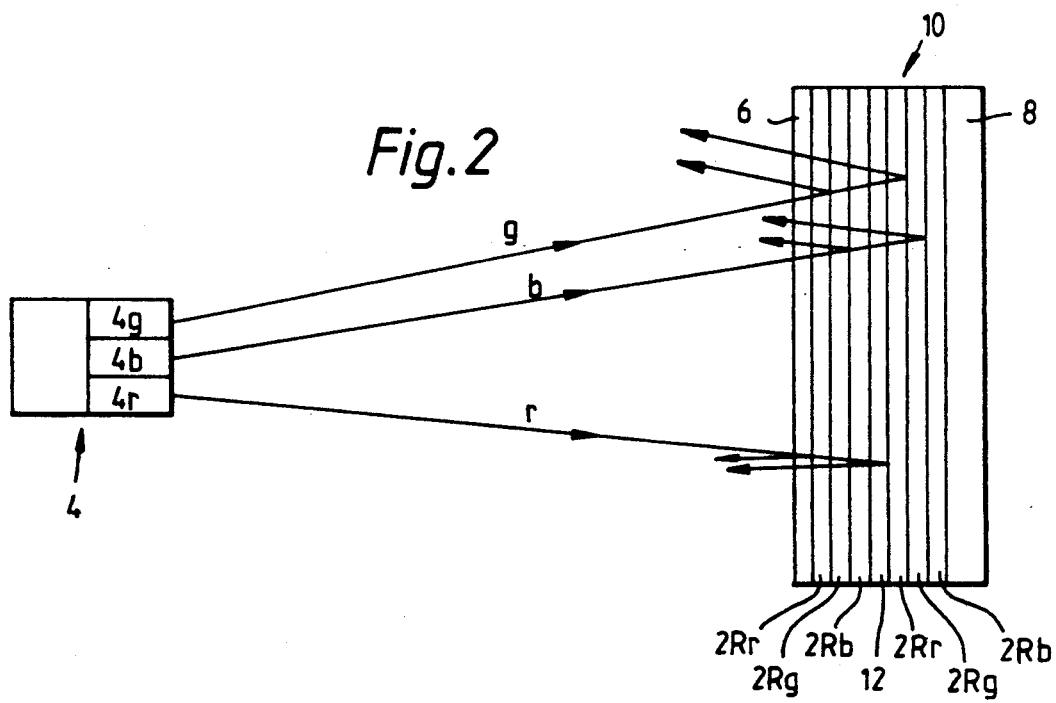

CHOLESTERIC LIQUID CRYSTAL SCREEN WHICH REFLECTS SUBSTANTIALLY ALL OF THE PROJECTED LIGHT

The present invention relates to a screen and projector for use in a front projection system.

It is well-known to produce an image on a screen by projection from a video, slide or movie projector. Generally, the use of such projectors is limited by the need to use them in situations where the level of ambient lighting is restricted. This is because the ambient light scattered or reflected from the screen degrades the contrast in the projected image. Alternatively, or in addition, it is necessary to use a projector lamp of high average intensity.

Solutions (termed 'active screen' solutions) to this problems are proposed in our published European Patent Applications Nos. 0363206 and GB 0363207. The latter, for example, discloses a method of producing a projected image on a defined surface in which the intensity of the projection light source is varied at or above a given frequency equal to or greater than a critical fusion frequency determined by the size and luminance of the projected image. A means for modulating light, such as a liquid crystal layer, which can be operated between a first and a second mode is also provided. Operation of the modulating means and the variation in the intensity of the light source are synchronized so that the modulating means in the first mode allows the projected image to be directly observed on the defined surface while the modulating means in the second mode allows the effect produced by any ambient light incident on the defined surface to be reduced. As the projected image can be seen when the modulating means is in the first mode while the effect of ambient light is attenuated when the modulating means is in the second mode, this improves the contrast between the projected image and the noise produced by ambient light.

The present invention provides a further solution to the problem of ambient light, which solution can be used as an alternative to, or in conjunction with, the active screen solutions disclosed in our two copending published European Patent Applications Nos. 0363206 and 0363207.

According to a first aspect of the present invention there is provided a screen for use in a front projection system, the screen comprising at least one section which reflects light of wavelength in at least one defined wavelength range and which reflects less light of wavelengths outside said at least one defined wavelength range.

According to a second aspect of the present invention there is provided a projector for use in a front projection system, the projector including at least one light source which emits light of wavelength only in an at least one defined wavelength range.

A screen according to said first aspect appears black or dark grey when viewed in daylight or artificial lighting having a broad spectral distribution as this ambient lighting has relatively little energy in the defined wavelength range which is reflected. However, the combination of a screen according to said first aspect and a projector according to said second aspect allows light from the projector to be efficiently reflected or backscattered by the screen to produce a bright image. The contrast of the image against ambient light is accordingly enhanced even under normal levels of ambient illumination.

The projection system provided by the combination may be monochrome or colour depending on the number of defined wavelength ranges used. In particular, colour pictures can be produced using three defined wavelength ranges respectively in the red, green and blue parts of the visible spectrum.

Embodiments of the present invention will now be described, by way of example only, and with reference to the accompanying schematic drawings in which:

FIG. 1 shows a front projection system using the combination of a screen and a projector provided in accordance with the present invention;

FIG. 2 shows a modification to the system of FIG. 1; and

Figure 3:
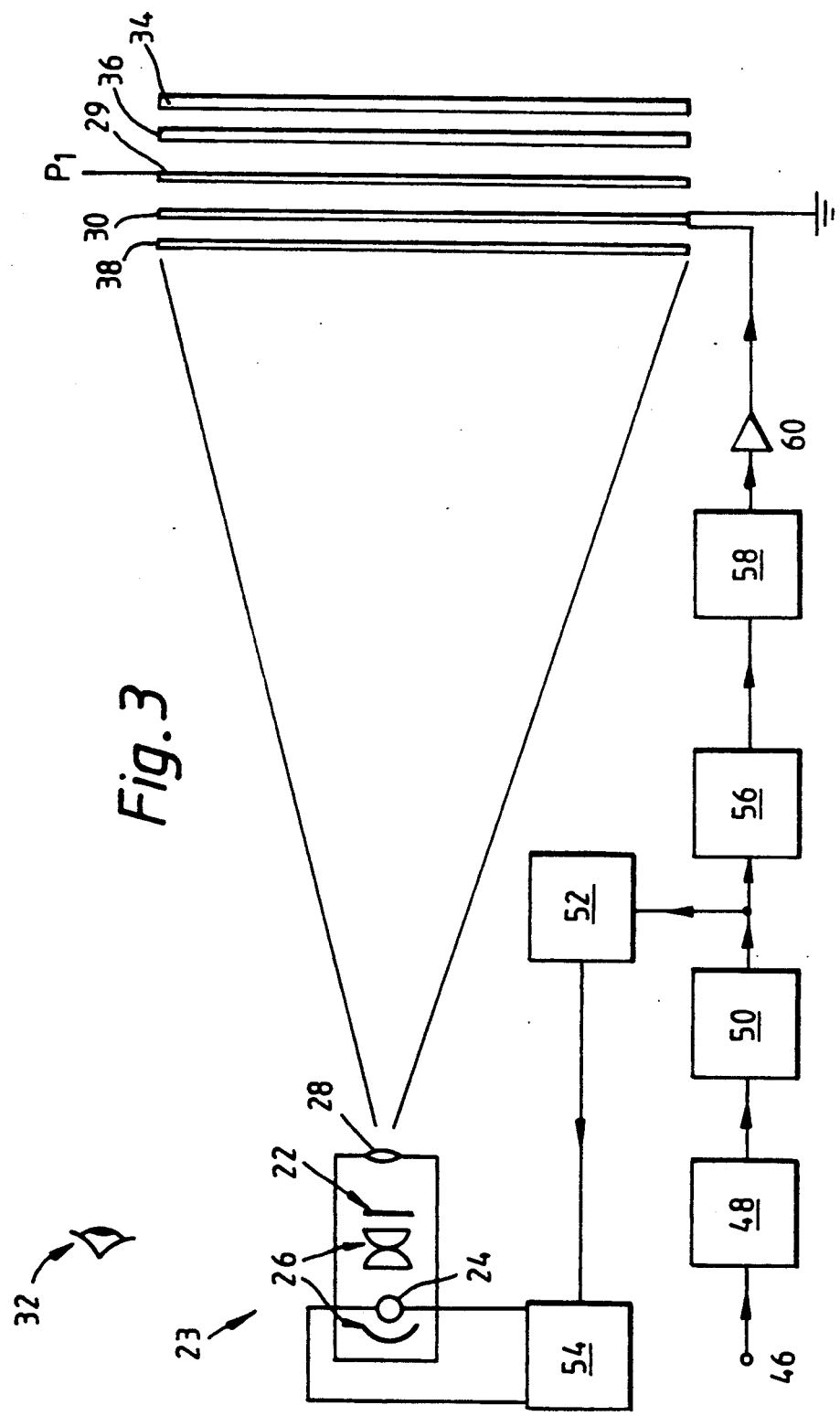
FIG. 3 shows a front projection system incorporating the screen and projector illustrated in FIG. 1.

Referring to the drawings, FIG. 1 shows is a schematic representation of a front projection system provided in accordance with the present invention. A reflective screen 2 (shown end on) has six dichroic layers containing cholesteric liquid crystal material. As is known by persons familiar with this art, cholesteric liquid crystal material exhibits a helical pitch, this being a bulk property of the material, easily defined by the mixture composition, and should, preferably be largely independent of operating temperature. The layers are in the form of liquid crystal polymer layers, termed 'Finkelman' polymers, or printed layers of emulsified or dispersed cholesteric droplets.

Cholesteric liquid crystal materials exhibit circular dichroic properties. Hence, a layer of cholesteric liquid crystal material reflects light of wavelength in a narrow defined wavelength range for a specific sense of circular polarisation. For a specific cholesteric liquid crystal material, the wavelength ($\lambda$) of peak reflection and the width ($\Delta\lambda$) of the spectral band (the defined wavelength range) are determined by the formulae:

$$\lambda = \bar{n}p$$

$$\Delta\lambda = p\Delta n$$

where
  $\bar{n}$ = average refractive index of the liquid crystal material.
  $\Delta n$ = birefringence of the liquid crystal material
  $p$ = helical pitch of the layer of liquid crystal material.

Light of wavelength in the defined wavelength range but of the opposite sense of circular polarisation and light of wavelengths outside the defined wavelength range is preferentially transmitted through the liquid crystal layer and so not reflected.

Thus, of the six layers in the screen 2, there are two layers reflecting light of wavelengths in narrow spectral bands in the red, green and blue parts of the visible spectrum (the layers being designated 2Rr and 2Lr, 2Rg and 2Rb and 2Lb respectively). Each of the two layers reflecting light of a defined narrow spectral band reflects light of opposite senses of circular polarisation (as designated by the letters L, R). Layers of material with the required reflective properties at room temperature can be produced from mixtures of differing liquid crystals to produce red, green and blue reflectors.

A projector 4 has three light sources 4r, 4g, 4b which respectively emit light of wavelengths in spectral bands corresponding to the bands of wavelengths which are reflected by the screen 2. The light sources 4r, 4g, 4b may be lasers or gas discharge lamps. The arrangement is such that a large proportion of the light emitted by the projector 4 to form an image is reflected by the screen 2 as indicated schematically by the arrows r, g, b. A diffusing coating 6 having low backscattering properties is provided on one side of the screen 2 to distribute the reflected projector light over a larger range of angles and so provide a larger viewing angle. (For simplicity the effect of the coating 6 on the reflected light has not been shown in the Figure).

As already indicated, light of wavelengths outside the defined wavelength ranges is preferentially transmitted by the screen. Thus, when ambient light, such as daylight or broadband artificial light is incident on the screen, the major part of the light is not reflected but transmitted by the screen. Only a relatively small proportion of the incident light is reflected and so the contrast of the image is enhanced. An absorbing layer 8 behind the screen 2 reduces the effect of ambient light from behind the screen 2.

FIG. 2 shows a modification to the embodiment of FIG. 1 and accordingly like parts are designated by like reference numerals. In this modification, the screen 10 comprises two sets of dichroic layers separated by a retarder 12 of half wavelength about 550 nm. The two sets of dichroic layers each consist of three layers 2Rr, 2Rg, 2Rb reflecting light of wavelengths in spectral bands in the red, green and blue parts of the visible spectrum, both sets reflecting light of the same sense of circular polarisation. The effect of the retarder 12 is to change the sense of circular polarisation of the transmitted light and hence the screen reflects light of both senses of circular polarisation.

In another modification, the screen reflects light of only one sense of circular polarisation and the projector emits light of that sense of circular polarisation.

It is envisaged that other dichroic materials, such as dichroic interference filters, may be used in place of the layers containing cholesteric liquid crystal material. It is further noted that in the present description the terms 'reflect' and 'transmit' have been used relatively. It is envisaged that the screen of the present invention may utilise layers of material which reflect light of wavelength in at least one defined wavelength range and reflect less light of wavelength outside said at least one defined wavelength range.

As already indicated, the screen of the present invention may be used in conjunction with the 'active screen' disclosed in our two copending European Patent Applications claiming priority from GB 8823490.1 and GB 8823523.9. FIG. 3 shows an embodiment from the latter patent application modified to include the screen of the present invention.

FIG. 3 shows a source picture 22, such as a conventional liquid crystal display (LCD) (e.g. an active matrix, a multiplexed twisted nematic or a ferroelectric colour television LCD), a photographic transparency, or a movie film frame, which is projected from a projector 23 using a source of light 24 whose intensity can be varied. The source emits light of wavelengths in three narrow spectral bands and may comprise three separate light sources, such as pulsed lasers or flash lamp pumped fluorescent plastics rods. The projector is otherwise of a conventional type or may be a lenseless shadow projector, e.g. of the Linnebach type (i.e. using a 'point' source to project an enlarged colour shadow image onto a screen).

The lamp 24 is flashed at a given frequency, typically of 50 Hz with each flash lasting for an interval in the range of from of the order of 1 microsecond to a few milliseconds. In order to produce an image which appears continuous, i.e. with no perceived flicker, the given frequency has to be equal to or greater than a critical fusion frequency, which is affected by both the luminance and the size of the image. The luminance of a continuous image so produced is equal to the average luminance of the flashing image.

The light from the flashing lamp 24 is projected via an optical collimation system 26 and a projection lens 28 and focussed onto a plane $P_1$ containing a screen 29, such as the screen shown in FIG. 1, provided in accordance with the present invention. Means 30 for modulating light are situated in front of the screen 29. The modulating means 30 is operable between a first mode and a second mode, operation being synchronised with the variation of light intensity so that more light is emitted to project the image onto the plane $P_1$ when the modulating means 30 is in the first mode.

The modulating means 30 comprises an electro-optic layer such as a sheet of plastics material which contains microencapsulated droplets of a nematic liquid crystal material including a dissolved dichroic dye. On either side of the sheet is laminated a plastics foil with transparent indium tin oxide electrodes on its surface. This forms a large area, e.g. 1 m × 3 m, electro-optic shutter which goes from absorbing to transparent when a potential difference is applied. Accordingly, the material can be rapidly switched (with a response time of about 1 ms to 5 ms) electrically between a first mode in which the modulating means 30 is transparent and a second mode in which the modulating means is absorbing.

The modulating means 30 in the first mode allows incident light on the reflective screen 29 from the flashing lamp 24 to be reflected and directly observed by an observer (indicated at 32) on the same side of the modulating means as the projector 23 (i.e. front-projection). In the second mode, the modulating means 30 is absorbing and so prevents ambient light incident on the front surface of the modulating means 30 being reflected to the observer while also preventing ambient light reaching the back surface of the modulating means 30 from being transmitted towards the observer. In this way, the effect produced from ambient light is reduced. A layer 34 of material prevents ambient light which reaches behind the modulating means 30 being observed by the observer 32 when the modulating means is transparent. Suitable materials for such a layer 34 include a black material, which would absorb ambient light incident thereon which reaches behind the modulating means 30. FIG. 3 also shows a louvred sheet 36 behind the modulating means 30, further to prevent ambient light which reaches behind the modulating means being seen by the observer 32 and an anti-reflection film 38 in front of the modulating means to reduce reflection of ambient light incident on the front surfaces of the modulating means 30.

Thus the flashing image is maximally directed to the eye of the observer 32 when the modulating means 30 is in the first mode, whereas any ambient light is attenuated during intervals between the flashes. The effect of ambient light is further attenuated due to the effect of the screen 29 as disclosed previously.

FIG. 3 also shows schematically the electrical circuitry used in the method. Waveforms generated from a source 46, optionally modified by means 48, control a pulse generator 50. The source 46 could be a 50 Hz AC mains supply or the field synchronisation pulses from a television, e.g. an LCD TV at 22, with the generated waveforms being modified by means 48 such as a full-wave rectifier and comparator.

The source 46 and pulse generator 50 are common to both the circuit for powering the lamp 24 and the circuit for switching the modulating means 30 and synchronise the flashing of the lamp 24 and the switching of the modulating means 30. The circuit for the lamp 24 further comprises a pulse delay unit 52 and the flash lamp drive electronics 54, e.g. a standard drive unit for a strobe type lamp. The circuit to switch the modulating means further comprises a pulse delay unit 56, a drive waveform generator 58 and an amplifier 60 to apply a potential difference, via the electrodes to the sheet of liquid crystal material in the modulating means. The pulse delay units 52, 56 so affect the pulses applied to flash the lamp 24 and switch the modulating means 30 that a zero or low potential difference is applied to switch the modulating means 30 to the first mode, translucent, when power is supplied to flash the lamp 24 and a potential difference of e.g. 60 V rms is applied, allowing the modulating means 30 to switch to the second mode, transparent, when no power is supplied to the lamp 24.

Modifications to the embodiments described will be apparent to those skilled in the art.

I claim:

1. A diffusely reflective screen for use in front projection system, which screen receives light projected thereon from said front projection system and comprises a plurality of cholesteric liquid crystal material members each possessing a defined pitch of liquid crystal material having a respective wavelength reflection characteristic, such that each member reflects light within a wavelength range defined by said respective reflection characteristic and transmits light outside said wavelength range, each of which members reflects less light of wavelengths outside each respective wavelength range; and an optical absorber suitable for absorbing light not reflected by said plurality of members whereby substantially all of said light from said front projection system which is within each wavelength range is reflected by said members.

2. A screen according to claim 1 wherein the screen comprises two members the respective pitches of which are of the same sense and are separated by a half-wavelength retarder for light of the wavelength about 550 nm.

3. The combination of a diffusely reflective screen for use in front projection system, which screen receives light projected thereon and comprises a plurality of cholesteric liquid crystal material members each possessing a defined pitch of liquid crystal material having a respective wavelength reflection characteristic, such that each member reflects light within a wavelength range defined by said respective reflection characteristic and transmits light outside said wavelength range, each of which members reflects less light of wavelengths outside each respective wavelength range; and an optical absorber suitable for absorbing light not reflected by said plurality of members, and a projector for said screen, said projector including a plurality of light sources each of which emits light only in each of said wavelength ranges thereby to optically cooperate with said screen whereby substantially all of said light from said plurality of light sources is reflected by said screen.

* * * * *